United States Patent [19]

Yamamoto et al.

[11] Patent Number: 4,757,889
[45] Date of Patent: Jul. 19, 1988

[54] GUIDE HEIGHT ADJUSTER

[75] Inventors: Kazuhiro Yamamoto; Osamu Mitsui, both of Tokyo, Japan

[73] Assignee: ANDO Electric Co., Ltd., Tokyo, Japan

[21] Appl. No.: 894,160

[22] Filed: Aug. 7, 1986

[30] Foreign Application Priority Data

Aug. 21, 1985 [JP] Japan ............................ 60-127676[U]

[51] Int. Cl.⁴ ............................................. B65G 11/00
[52] U.S. Cl. ........................................ 193/38; 193/41; 198/837; 72/428; 211/208; 248/297.3
[58] Field of Search ............ 193/38, 41, 25 FT, 35 C, 193/35 R; 198/836, 837, 860.3, 861.1; 72/428; 211/208; 221/241; 248/297.3, 260

[56] References Cited

U.S. PATENT DOCUMENTS 3,854,688 12/1974 Shuford .................................. 193/38
3,874,497 4/1975 Carlson ................................ 198/836
3,974,904 8/1976 Morton .................................. 193/38

Primary Examiner—Galen Barefoot
Assistant Examiner—Lynn M. Fiorito
Attorney, Agent, or Firm—Panitch, Schwarze Jacobs and Nadel

[57] ABSTRACT

A guide height adjuster comprises a block consisting of a plurality of steps of different heights integrally joined together and having a slot formed to allow the passage of a screw across all the steps, a guide holder having a through hole for the insertion of the screw, and a guide to formed as to cover substantially a channel through which components being handled pass, the guide being secured to, and supported by, the guide holder. The guide holder rests on one of the steps and is fastened to the block by the screw so that the guide can be held above the channel. The height of the guide above the channel can be changed by loosening the screw and moving the block with respect to the screw, thereby shifting the guide holder to another block step of a desired height.

1 Claim, 1 Drawing Sheet

GUIDE HEIGHT ADJUSTER

SUMMARY OF THE INVENTION

This invention relates to a guide height adjuster, and more particularly to a height adjuster for a guide which is held above a channel for components to substantially cover it at a height suitably set according to the height of the components to avoid tumbling of the components, jamming of the channel, and deformation of the components while being conveyed along the channel.

The present invention provides a guide height adjuster, or an arrangement in which a guide held above a channel for components is adjusted to a height suited for the passage of the components, the adjustment being done by merely loosening a screw that fixes a guide holder in position and moving a block that carries the guide holder together with the guide with respect to the screw.

DESCRIPTION OF THE PREFERRED EMBODIMENT

Figure 1:
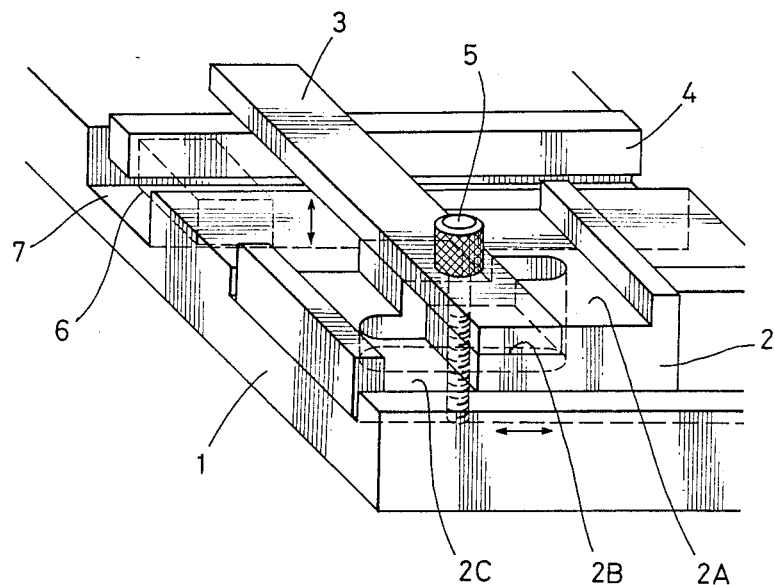
FIG. 1 is a general view of an embodiment of the invention.

Referring to FIG. 1, which illustrates the general construction of an embodiment of the invention, 1 is a base, 2 a block, 3 a guide holder, 4 a guide, 5 a thumbscrew, 6 one of components being handled, and 7 a channel.

Block 2 consists of steps 2A to 2C of different heights integrally joined together, with a slot 2D formed across the steps to permit the movement of thumbscrew 5 therethrough.

Figure 2:
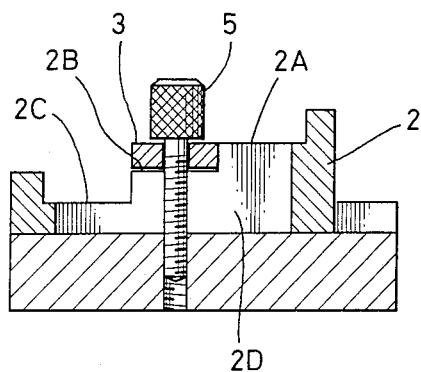
FIG. 2 is a sectional view of a slot 2D.

Although FIG. 2 shows three steps 2A to 2C joined in one piece, the block may have a larger or smaller number of steps instead, according to the necessity.

Guide holder 3 is adapted to rest on any of steps 2A to 2C and has a hole through which thumbscrew 5 is inserted.

Guide 4 is secured to holder 3, which in turn is fixed to block 2 by thumbscrew 5 so as to hold guide 4 above channel 7 in which component 6 passes.

Above channel 7, guide 4 is set to a height sufficient for component 6 to pass clear of the guide.

Whenever the height of guide 4 above channel 7 must be changed to handle components of a different height, it is only necessary to loosen thumbscrew 5 and shift guide holder 3 to another step of a height suitable for the new components. The shift is accomplished simply by sliding block 2 accordingly; there is no need of removing thumbscrew 5 from the base and block.

For example, in FIG. 1, guide holder 3 rests on step 2B. When it is desired to shift the holder to the adjacent step 2C, thumbscrew 5 is loosened and block 2 moved to the point where guide holder 3 comes down to step 2C. Thumbscrew 5 need not be completely disengaged and taken out, since the block with slot 2D moves with respect to the screw confined within the slot.

Slot 2D is shown, in longitudinal section, in FIG. 2.

As is clear from FIG. 2, slot 2D extends across steps 2A to 2C. Consequently, guide holder 3 can be set to a desired height by loosening thumbscrew 5 and moving block 2 and therefore its slot 2D relative to the screw, in place of removing the screw from the block.

When a plurality of channels 7 instead of a single one shown in FIG. 1 are to be provided in parallel, guide holder 3 is extended across those channels, with a corresponding number of additional blocks 2 arranged parallelly to cover the individual channels.

Where a longer guide 4 or guides are to be employed, as the case may be, an additional guide holder 3 or holders are provided.

According to the present invention, because slot 2D is formed across all steps 2A to 2C, the height of guide 4 can be adjusted by merely loosening thumbscrew 5, and hence a channel suitable for the passage of components 6 of a given height can be built with ease.

What is claimed is:

1. A guide height adjuster comprising
   a block consisting of a plurality of steps of different heights integrally joined together and having a slot formed to allow the passage of a screw across all said steps,
   a guide holder having a through hole for the insertion of said screw, and
   a guide so formed as to cover substantially a channel through which successive ones of components to be handled pass and to define the height of said components, said guide being secured to, and supported by, said guide holder,
   said guide holder resting on one of said steps and fastened to said block by said screw so that said guide can be held above said channel, the height of said guide above said channel being changeable by loosening said screw and moving said block with respect to said screw, thereby shifting said guide holder to another block step of a desired height.

* * * * *